United States Patent

Scheiter

[15] 3,653,272
[45] Apr. 4, 1972

[54] ACCESSORY DRIVE MECHANISM

[72] Inventor: Milton H. Scheiter, Bloomfield Hills, Mich.

[73] Assignee: General Motors Corporation, Detroit, Mich.

[22] Filed: Aug. 17, 1970

[21] Appl. No.: 64,292

[52] U.S. Cl. .............................................. 74/190.5, 74/200
[51] Int. Cl. .................................... F16h 15/04, F16h 15/38
[58] Field of Search .......................................... 74/190.5, 200

[56] References Cited

UNITED STATES PATENTS

| | | | |
|---|---|---|---|
| 3,276,279 | 10/1966 | Perry et al. | 74/200 X |
| 3,142,190 | 7/1964 | Kelsey et al. | 74/200 |
| 3,163,051 | 12/1964 | Kraus | 74/200 |
| 3,164,025 | 1/1965 | Francisco, Jr. | 74/200 |
| 3,394,617 | 7/1968 | Dickenbrock | 74/190.5 X |
| 3,413,864 | 12/1968 | Magill et al. | 74/200 |

*Primary Examiner*—Leonard H. Gerin
*Attorney*—Warren E. Finken, A. M. Heiter and John P. Moran

[57] ABSTRACT

An accessory drive mechanism having a continuously variable output/input speed ratio including a housing containing a predetermined volume of fluid, input means, output means, a drive pulley operatively connected to the input means, an input race member having a toroidal surface formed thereon and mounted for rotation with the input means, an output race member having a toroidal surface formed thereon oppositely disposed from the first-mentioned toroidal surface, a plurality of rollers frictionally engaging the oppositely disposed toroidal surfaces, drive means formed on the output means for driving engine accessories, and an "internal sensing" ratio control means including a nonrotating pitot tube means for sensing changes in fluid force reflecting changes in input speed and including a piston-actuating mechanism for inclining the rollers, effectuating roller tilt along the toroidal surfaces to change the output/input speed ratio in response to the changes in fluid force communicated thereto by the pivot tube means.

9 Claims, 5 Drawing Figures

INVENTOR.
*Milton H. Scheiter*
BY
*John P. Moran*
ATTORNEY

ACCESSORY DRIVE MECHANISM

This invention relates to an accessory drive mechanism and, more particularly, to a drive mechanism of the continuously variable type.

While various types of accessory drive transmission mechanisms have been suggested and used heretofore, it may be desirable for particular engine applications to drive the accessories associated therewith by means of a "toric-type" transmission wherein the output race thereof is caused to rotate at a substantially constant speed, regardless of any changes in input speed, with the actuating means therefor being contained within the housing of the accessory drive mechanism.

Accordingly, an object of the invention is to provide an improved accessory drive transmission mechanism including a continuously variable drive means for maintaining the output therefrom at a substantially constant speed.

Another object of the invention is to provide an accessory drive transmission wherein the ratio control means for causing the output race to rotate at a substantially constant speed, regardless of input speed, is completely contained within the accessory drive housing and is fluid-actuated.

A further object of the invention is to provide an accessory drive transmission wherein the "internal sensing" means includes a supply of fluid, a pitot tube for reflecting any changes in fluid force in response to change in input speed, and a piston arrangement actuated by such changes in fluid force, with linkage means between the piston arrangement and the toric rollers for changing the inclination of the rollers in response to such piston movement, as required to effectuate a tilt of the rollers between the races to maintain the output race at a substantially constant speed.

These and other objects and advantages of the invention will become apparent when reference is made to the following description and accompanying drawings, wherein.

Figure 1:
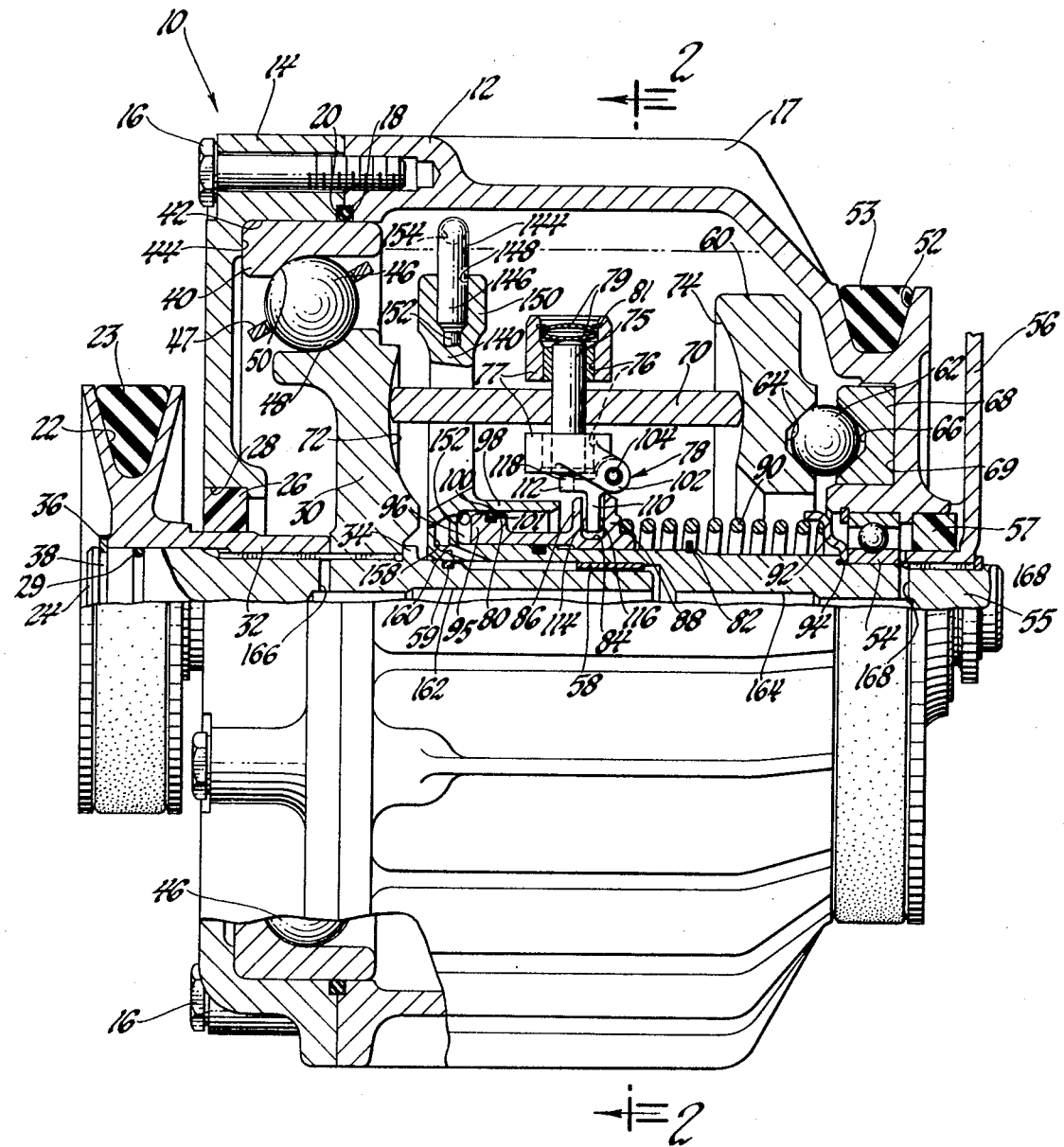
FIG. 1 is a fragmentary cross-sectional view of an accessory drive mechanism embodying the invention.

Referring now to the drawings in greater detail, FIG. 1 illustrates an accessory drive transmission mechanism 10 including a rotatable housing 12 and an end cover 14 secured thereto by bolts 16. Cooling fins 17 may be formed on the housing 12. An O-ring seal 18 mounted in a groove 20 prevents leakage therebetween. An input pulley 22, driven by a conventional belt 23, is mounted on an input shaft 24 which extends into the housing 12 through a seal 26 mounted in an opening 28 formed in the end cover 14. An O-ring seal 29, mounted between the input shaft 24 and a hub 32 of the pulley 22, prevents leakage therebetween.

An input race 30 is secured to the input shaft 24 and located axially thereon by virtue of the race 30 and the hub 32 of the pulley 22 being confined between a shoulder 34 formed on an intermediate portion of the shaft 24 and a retainer ring 36 mounted in a groove 38 adjacent the outer end of the shaft 24.

A ring member 40 is mounted adjacent the inner surface 42 and the inner face 44 of the end cover 14 radially outwardly of the input race 30. Axial loading of the input race 30 is accomplished by a plurality of balls 46 mounted in a cage 47 between contoured surfaces 48 and 50 formed on the outer periphery of the input race 30 and the inner periphery of the ring member 40, respectively. The contoured surfaces 48 and 50 are such that there is a rightward force (FIG. 1) on the balls 46 by the ring member 40 and a leftward force thereon by the input race 30.

The rotatable housing 12 includes an output pulley 52 formed thereon and is rotatably mounted on a bearing 54 on a reaction shaft 55 extending through a reaction member 56. The pulley 52 may include single or multiple grooves, as desired. A conventional V-belt 53 is used to drivingly connect the pulley 52 to any conventional engine accessory. A seal 57 is mounted adjacent the bearing 54 between the reaction member 56 and the housing 12. The inner end of the reaction shaft 55 is counterbored to fit over the inner end of the input shaft 24, an intermediate bearing 58 permitting relative rotation therebetween and a seal 59 preventing leakage therebetween.

An output race 60 is supported radially by additional axial loader balls 62 mounted in ramped pockets 64 formed in the back face of the output race 60, the balls 62 having the opposite sides thereof confined in ramped pockets 66 formed in a ring member 68 secured in an annular internal groove 69 formed in the housing 12.

A plurality of circumferentially spaced disc-type rollers 70 are rotatably confined between toroidal surfaces 72 and 74 formed on opposing inner faces of the input and output races 30 and 60, respectively. Each roller 70 is secured to a centrally located shaft member 75 whose ends are supported in generally radially aligned bearings 76 in spaced-apart hub portions of a carrier 77. Normal shaft-to-bearing clearance will allow free movement of the shaft member 75 and the roller 70 in the plane of shafts 75. One end of the roller shaft member 75 extends through an open end of radially innermost bearing 76 in the carrier 77 and is associated with and connected to ground through a control mechanism 78. The other end of the shaft member 75 extends through the other bearing 76 and abuts against one of a plurality of Belleville springs 79 retained at their edges in the carrier 77 by a retainer ring 81.

The control mechanism 78 for tilting the rollers 70 between the respective input and output races 30 and 60 includes a piston 80 slidably mounted on the reaction shaft 55. A stop member 82 mounted on the shaft 55 limits the rightward movement of the piston 80 along the shaft 55. An annular groove 84, having opposing radially extending side walls 86 and 88, is formed around the periphery of the slidable piston 80. A spring 90 is mounted around the reaction shaft 55 between the outer surface of the wall 88 and a retainer member 92 mounted between the bearing 54 and a shoulder 94 formed on the shaft 55 and urges the piston 80 to the left in FIG. 1.

The shoulder 95 of the piston 80 serves as a movable wall in a cylindrical chamber 96, the latter being formed within an annular hub member 98 mounted around the innermost end of the reaction shaft 55. A seal 100 is mounted in a groove 101 in the shoulder 95 of the piston 80, sealing the inner surface of the hub member 98 to prevent leakage therebetween.

The control mechanism 78 further includes a rotatable link member 102 pivotally mounted on a pin 104 secured between spaced tabs 106 and 108 (FIG. 2) formed on one of the carriers 77. The link member 102 includes a first downwardly (FIG. 1) projecting leg member 110 and a second leftwardly (FIG. 1) projecting leg member 112. Rounded abutment members 114 and 116 are formed on opposite sides of the first leg member 110 for contacting the adjacent side walls 86 and 88, respectively. A rounded abutment member 118 is formed adjacent the end of the second leg member 112 for contacting the extended end of the roller shaft member 75.

Figure 2:
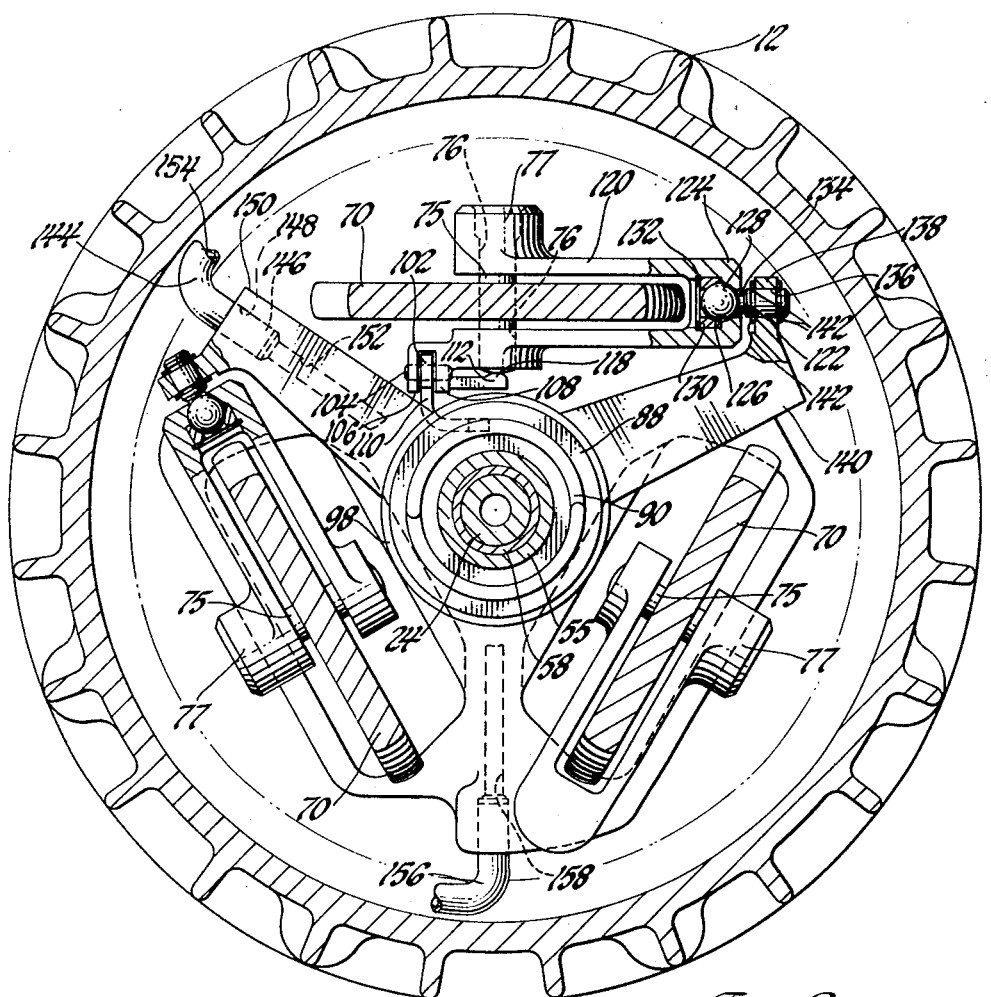
FIG. 2 is a cross-sectional view taken along the plane of line 2—2 of FIG. 1, and looking in the direction of the arrows.

Referring now to FIG. 2, it may be noted that the carriers 77 each include a U-shaped portion 120 which extends radially across opposite faces of each roller 70 to an outside edge thereof. An opening 122 is formed in the outermost portion 124 of each U-shaped portion 120, including a partial spherical seat 126 for a ball-end member 128. The ball-end member 128 is maintained in place on the seat 126 by a cylindrical spacer 130 and a retainer ring 132 secured in the U-shaped member 120 adjacent the outermost portion 124 thereof. A pin extension member 134 is secured to each ball member 128 and extends outwardly through the opening 122, and thence through an opening 136 formed in an end lug 138 extending from a member 140. A pair of retainer rings 142 are mounted on opposite faces of the end lug 138 to hold the pin member 134 in place therein. The lever members 140 are connected at their radially inner ends to the annular hub member 98 and the innermost end of the reaction shaft 55.

A first pitot tube 144 has one end 146 thereof mounted in an opening 148 formed in the radially outermost end 150 of the reaction members 140. A radial passage 152 communicates between the open outer end 154 of the pilot tube 144 and the cylindrical chamber 96 (FIG. 1) for supplying fluid thereto to actuate the piston 80 and, hence, the control mechanism 78. When the housing 12, 14 is rotating, the fluid level therein is radially inward of the pitot tube opening 154, as illustrated by the broken line in FIG. 1, adjacent the outer peripheries of the races 30 and 60.

A second pitot tube 156 (FIG. 2) is associated with a second member 140 in the above-described manner to communicate fluid via a radial passage 158 to a passage 160 (FIG. 1) formed in the reaction shaft 55, the latter passage, in turn, communicating through the bearing 58 mounted between the shafts 24 and 55 to axially aligned and interconnecting passages 162 and 164 formed in shafts 24 and 55, respectively. Radical openings 166 and 168 are formed in the respective shafts 24 and 25 to accommodate the lubrication of the bearings 46 and 54, respectively.

OPERATION

The input pulley 22, driven by the conventional V-belt 23 rotated by a powered shaft (not shown), rotates the input shaft 24, which, in turn, rotates the input race 30. Due to the frictional contact between the input race 30 and the rollers 70, the latter are caused to rotate about their respective axes and transmit a rotation to the output race 60 in a direction opposite to that of the input race 30. Rotation of the output race 60 is transmitted through the axial loader balls 62 in the ramped pockets 64 and 66 to the ring member 68 which is secured to the housing 12. Rotation of the housing 12 thus rotates the integral output single or multiple pulley 52 which is operatively connected by the conventional V-belt or belts 53 to one or more engine accessories. It is generally desirable that such engine accessory be driven at a substantially constant speed, regardless of engine speed, such as represented by the various curves of FIG. 3 considered to be suitable for the particular accessories indicated.

It may be realized that the angle of tilt of the rollers 70 between the input and output races 30 and 60, respectively, determined the output/input speed ratio. For example, with the edges of the rollers 70 in contact with a radial outer portion of the toroidal surface 72 of the input race 30 and a radial inner portion of the toroidal surface 74 of the output race 60, respectively, the speed of the output race 60 would be greater than that of the input race 30 and, correspondingly, respective inner and outer portions of the rollers 70 on the toroidal surfaces 72 and 74 would produce a decreased output/input speed ratio.

Tilting of the rollers 70 is accomplished in the drive mechanism 10 by means of "internal sensing" resulting from the speed of rotation of the fluid contained in the housing 12, 14, under the action of centrifugal force, past the open end 154 of the pitot tube 144.

Consider now that engine speed has been decreased, resulting, through the interconnecting belt 23, in a slower rotation of the input pulley 22 and the input race 30. This correspondingly decreases the rotational speeds of the roller 70 and the output race 60 and the associated output pulley 52. However, since the fluid in the housing 12, 14 now also rotates slower under the action of centrifugal force, the resultant decreased force of the fluid communicated through the open end 154 of the pitot tube 144, the passage 152 and the chamber 96 to the left end (FIG. 1) of the slidable piston 80, will permit the spring 90 to move the piston to the left, causing the leg 110 of the control mechanism 78 to be moved leftwardly by the resultant reaction between the side walls 86 and 88 and the respective rounded abutment members 114 and 116.

Since the associated link member 102 of the control mechanism 78 pivots about the pin 104, the rounded abutment member 118 of the leg member 112, already in contact with the exposed end of the roller shaft member 75, will be urged upwardly against the end of the shaft member 75. Direct upward movement of the shaft 75 is prevented by virtue of the shaft 75 being fixed in the center of roller 70 and the roller being fixed in space by its edge contact with the toroidal surfaces 72 and 74 of the respective input and output races 30 and 60. Accordingly, since the abutment member 118 cannot move upwardly (FIG. 1), the pin member 104 and the link member 102 will be forced downwardly.

As may be noted in FIG. 2, the downward movement of the link member 102 will cause the carriers 77, since all three carriers 77 are interconnected by the reaction members 140 and the hub 98, to rotate in a counterclockwise direction (FIG. 2) about the respective ball-end members 128, causing the shaft 75 to follow an arcuate inclining path about the center of the member 128, thus generating an inclining force couple on the rollers to cause them to incline downwardly on the left in FIG. 2 and, correspondingly, upwardly on the right between the races 30 and 60 assuming counterclockwise rotation of the input race 30, as viewed from the right of FIG. 1. It may be noted that the axis of the roller shaft member 75 during inclination will not be through the axis of the shaft 24. Such inclination will result in tractive forces at the respective contacting surfaces between the rollers 70 and the races 30 and 60. These tractive forces cause the rollers 70 to tilt in response thereto. The shaft member 75 follows an arcuate path, as permitted by the clearance around the bearings 76 in the carrier 77 to a position wherein the extension of its axis once again passes through the axis of the shaft 24, thus cancelling the inclining couple on the roller shaft 75.

Figure 3:
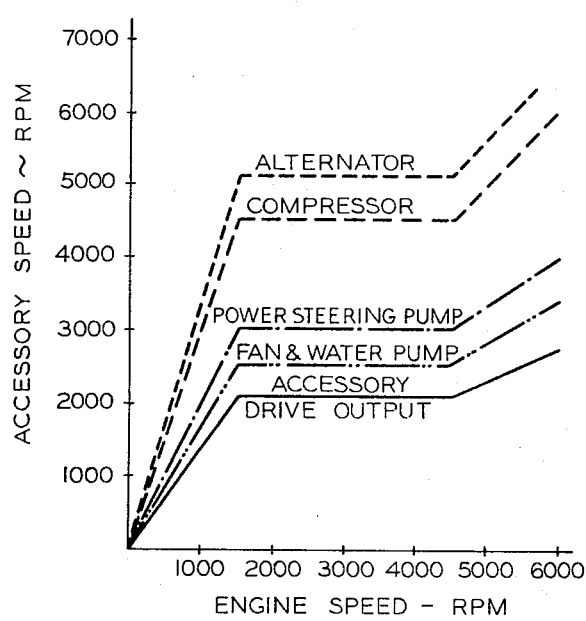
FIG. 3 is a graph illustrating operating characteristics of the invention.

Referring now to FIG. 1, the tilt of the left edge of the roller 70 will be upwardly and that of the right edge downwardly, the centerline of the shaft member 75 once again extending through the center of the shaft 24, thus causing the rotational speeds of the output race 60 and the associated output pulley 52 to increase to the predetermined substantially constant speed illustrated by the curves of FIG. 3. Should the carrier 77 wander too far and cause the centerline of the roller shaft member 75 to move to the opposite side of the shaft 24 centerline, the Belleville springs 79 will incline the carrier oppositely by overcoming the piston force, forcing the shaft member 75 to return to its center position. An increase in engine speed would produce the opposite action of the pertinent components to retain the predetermined substantially constant speed.

FIG. 4 EMBODIMENT

Figure 4:
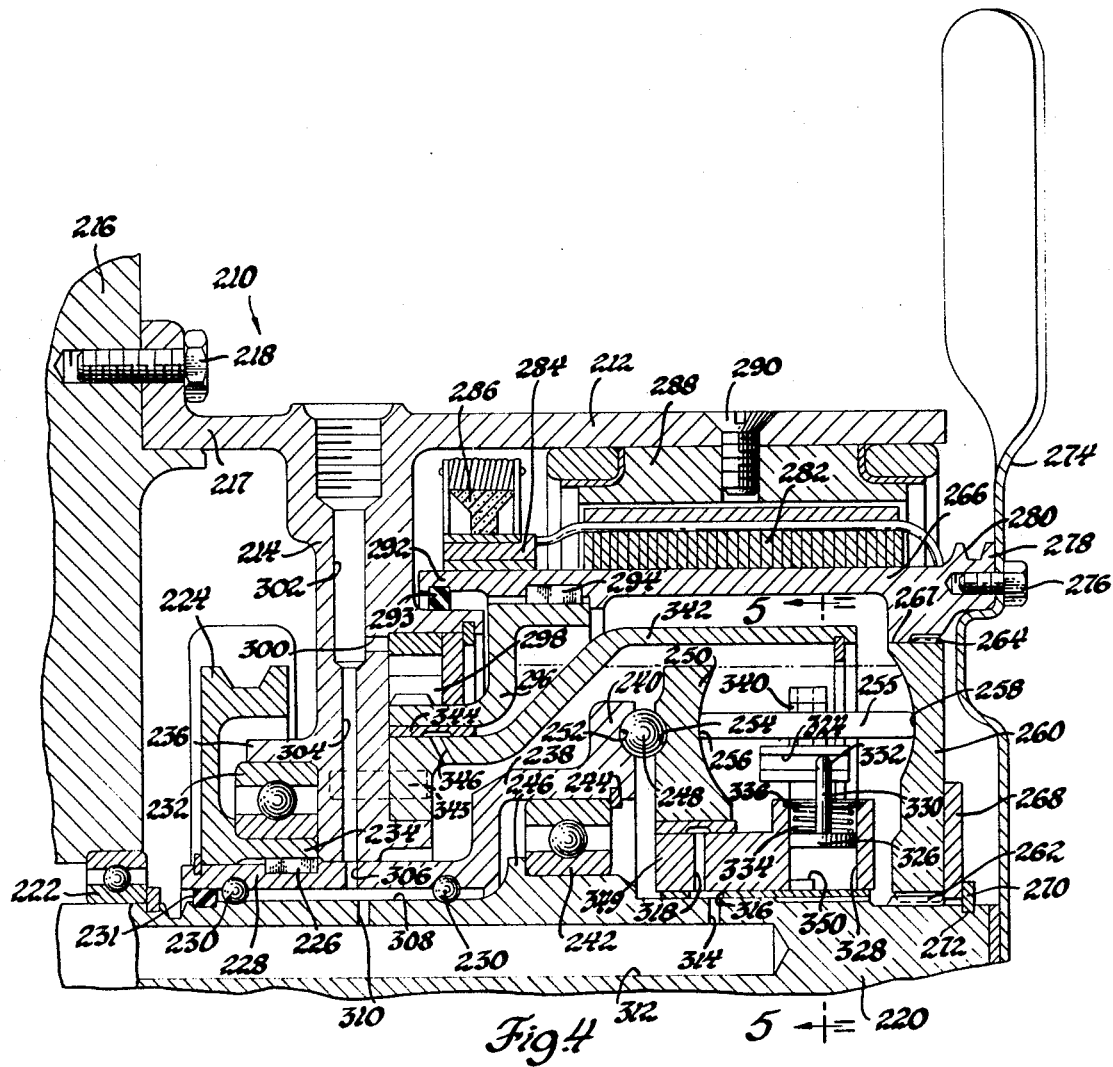
FIG. 4 is a fragmentary cross-sectional view illustrating an alternate embodiment of the invention.

Referring now to FIG. 4, there is illustrated another accessory drive transmission mechanism 210 embodiment including a housing 212 having a wall portion 214 spaced apart from the engine 216 and a rearwardly extending collar member 217 extending from the wall portion 214 and secured to the engine 216 by bolts 218. A shaft, such as a water pump shaft 220, extends from the engine 216 through bearings 222 into the housing 212. An input pulley 224 is secured by a key 226 to a sleeve member 228 which is rotatably mounted on bearings 230 on the shaft 220 in the space intermediate the engine 216 and the housing 212. A seal 231 mounted adjacent the outermost end of the sleeve member 228 prevents leakage between the member 228 and the shaft 220. The pulley 224 rotates relative to the housing 212 by virtue of a bearing 232 being rotatably mounted between a cylindrical extension 234 formed on the pulley 224 and a cylindrical extension 236 formed on the housing 212.

A cup-shaped extension 238 of the sleeve member 228, including a flange 240, is formed on the sleeve member 228, and supported within the housing 212 on the water pump shaft 220 by a bearing 242, the cup-shaped member 238 and the shaft 220 being maintained in axial alignment relative to one another by virtue of the bearing 242 being confined axially between a retainer ring 244 mounted on the inner surface of the member 238 and a shoulder 246 formed on the shaft 220.

Axial loader ball members 248 are mounted between the flange 240 and an input race member 250 in oppositely disposed pockets 252 and 254, respectively, which may include ramp-shaped sides along which the balls 248 may move to properly transmit input torque from the flange 240 to the input race 250. A plurality of rollers 255 are mounted between and in frictional engagement with a toroidal surface 256 formed on the adjacent side of the input race 250 and an oppositely disposed toroidal surface 258 formed on an output race member 260. The latter is connected by inner splines 262 to the water pump shaft 220, and by outer splines 264 to a drum member 266. Additionally, the output race member 260 is press-fitted in the drum 266 at surface 267 adjacent the splines 264 to prevent leakage therepast. The axial load caused by the balls 248 rolling up the ramp-shaped sides of the pockets 252 and 254 is resisted by the shoulder 246 on the shaft 220 through the bearing 242, and a Belleville-type preload spring 268 mounted between the outer face of the output race 260 and a retainer ring 270 mounted in a groove 272 formed in the shaft 220.

A conventional cooling fan 274 is secured by bolts 276 to an end face 278 of the drum 266. One or more sets of pulley grooves 280 may be formed on the outer periphery of the drum or inner housing 266 adjacent the fan 274 for accommodating V-belts (not shown) to drive other engine accessories.

The drum 266 may serve as the armature shaft of a generator 282, consisting of a commutator 284 and brush assembly 286. The field 288 is secured to the housing 212 by any suitable means, such as bolts 290. The inner end 292 of the drum 266 is sealed from the wall portion 214 by a seal 293 and is connected by a key 294 to rotate a driving member 296 of a power steering pump 298. The housing 212 serves as a sump for the power steering pump 298, containing a predetermined volume of fluid. The fluid flow from the pump 298 is via passages 300 and 302 formed in the wall portion 214 of the housing 212. Other cooperating passages, such as passages 304, 306, 308, 310, 312, 314, 316 and 318, provide access for the pumped fluid to serve as a lubricant for the various moving members and bearings of the drive unit 210.

Now, it is apparent that the roller 255 is illustrated in a 1:1 drive ratio position. It should also be apparent that if the rollers 255 were tilted between the races 250 and 260 a different output/input speed ratio would result. For example, if the left edge contacting the input race 250 were upwardly moved along the surface 256, while the right edge were moved downwardly along the surface 258 of the output race 260, an increased output/input speed ratio would result. The opposite result would, of course, occur if the left edge of the roller 255 were tilted downwardly.

While the tilting process is generally similar to that described above relative to FIGS. 1 and 2, the structure varies somewhat therefrom. Specifically, each roller 255 is secured to a respective shaft member 320 which, in turn, is rotatably mounted at its ends in a carrier member 322, better seen in FIG. 5. A slot 324 is formed in an extension 325 formed on the carrier 322, the sides of the slot 324 being parallel to the plane of the adjacent roller 255. A piston 326 is slidably mounted in a chamber 328 and includes a stem member 330 having a ball-end 332 formed thereon which extends into the slot 324 to cause the carrier extension 325 and the ball-end 332 to move together. A spring 334 is mounted between the piston 326 and a retainer ring 336 in the chamber 328, urging the piston 326 downwardly (FIG. 4) therein. As may be noted in FIG. 4, the centerline of the piston 326 is offset slightly with respect to the centerline of the roller 255.

Figure 5:
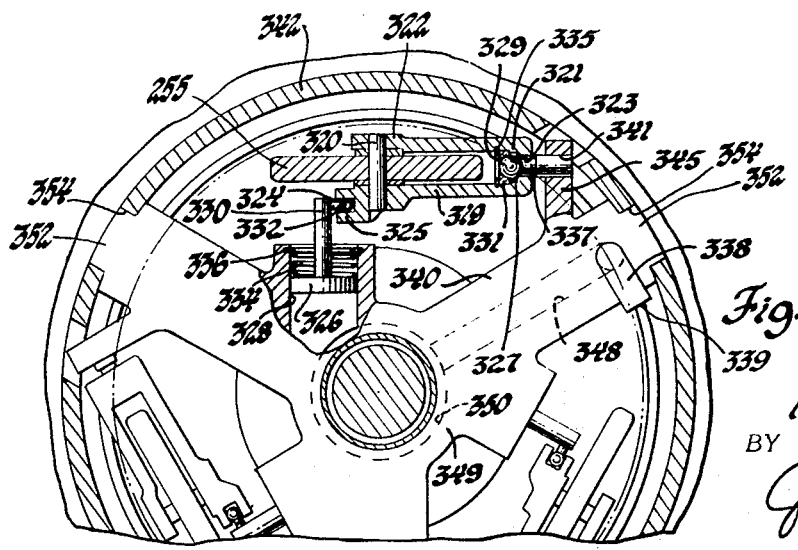
FIG. 5 is a cross-sectional view taken along the plane of line 5—5 of FIG. 4, and looking in the direction of the arrows.

Referring now to FIG. 5, it may be noted that the carriers 322 each include a U-shaped portion 319 which extends radially across opposite faces of each roller 255 to an outside edge thereof. An opening 323 is formed in the outermost bottom portion 321 of each U-shaped portion 319, including a partial spherical seat 327 for a ball-end member 329. The ball-end member 329 is maintained in place on the seat 327 by a cylindrical spacer 331 and a retainer ring 335 secured to the U-shaped member 319 adjacent the bottom portion 321 thereof. A pin extension member 337 is secured to each ball member 329 and extends outwardly through the opening 323, and press-fitted in an opening 341 formed in an end lug 345 extending from a spider or lever member 340.

The lever members 340 are connected at their radially inner ends to an annular hub member 349, the latter being rotatably mounted on the output shaft 220 and rotatably supporting the input race 250. The spider member 340 is secured at its radial outer ends to a nonrotating member 342 by means of extensions 352 mounted in slots 354 formed in the member 342. The latter is retained adjacent the fixed wall portion 214 by an interconnecting pin 343. A bearing 344 is mounted between the member 342 and the rotating member 296. The bearing 344 receives its lubrication via a passage 346 formed through the member 342 and communicating with the main central chamber formed within the drum member 266.

A pitot tube 338 with an opening 339 is mounted on the member 340. A passage 348 is formed in the member 340 to communicate between the opening 339 and an annular passage 350 which leads to the chamber 328 on the side of the piston 326 opposite the spring 334. The level of the supply of fluid within the housing formed by the drum 266, the output race 260 and the wall portion 214, under the action of centrifugal force, would be radially inward of the opening 339 of the pitot tube 338, as illustrated by the broken line in FIG. 4.

In operation, a reduction in engine speed will decrease the rotational speed of the input pulley 224 and the input race 250, correspondingly decreasing the speeds of the rollers 255, the output race 260, the associated housing 266. However, since the fluid in the housing formed by the members 266, 260, 214, 296, 342 and 228 would be rotating under the action of centrifugal force, the resultant decreased force of the fluid communicated through the pitot tube 338 and the passages 348 and 350 to the chamber 328 below (FIG. 4) the piston 326 will permit the spring 334 to move the piston 326 downwardly, causing the stem 330 and the ball-end 332 to pull the carrier extension 325 and the carrier 322 downwardly. Since the carrier extension 325 extends off to the side of the roller 255 between the races 250 and 260, the rollers 255 will incline between the races 250 and 260. Such inclination of the rollers 255 will create tractive or steering forces at the contacting edges thereof with the races 250 and 260, such that the rollers 255 will be tilted between the races 250 and 260. The amount of tilt will be determined by the force of the fluid in the chamber 328 on the piston 326, there being only one position of the ball-end 332 in the slot 324 for a given tilt angle. As the tilting action occurs, the sides of the slot 324 will tilt with the roller 255, remaining parallel thereto, while the ball-end 332 of the piston 326 rides along the slot 324 to the right in FIG. 4 until all of the original inclination has been canceled. The latter action is aided by virtue of the centerline of each piston 326 being offset with respect to the centerline of the roller 255. The specific tilt will result in the left (FIG. 4) edge of the rollers 255 being positioned upwardly on the toroidal surface 256 of the input race 250 and downwardly on the toroidal surface 258 of the output race 260. This will increase the rotational speed of the output race 260 and the associated drum member 266 until the speed thereof reaches the predetermined substantially constant speed. An increase in engine speed would, of course, produce the opposite action of the rotating parts to regain the predetermined substantially constant speed.

It should be apparent that the invention provides a novel means for controlling the engine accessory drive speed in response to an internal fluid signal, thus eliminating the need for external costly and troublesome controls, with the additional advantage of having the same fluid available for the actuation of various engine accessories, such as a power steering pump and, if desired, including a plurality of engine accessories in a single housing surrounding the drive mechanism.

While but two embodiments of the invention have been shown and described, other modifications thereof are possible.

I claim:

1. An engine accessory drive mechanism comprising a housing, a source of fluid therein, said fluid being rotatable with said housing, an input means, an output means operatively connected to said housing, a pulley operatively connected to said input means, an input race member having a toroidal surface formed thereon and mounted for rotation with said input means in response to rotation of said pulley, an output race member having a toroidal surface formed thereon oppositely disposed from said first-mentioned toroidal surface and operatively connected to said output means, a plurality of rollers frictionally engaging said oppositely disposed toroidal surfaces, drive means formed on said output means for driving engine accessories, and fluid speed-sensing ratio control actuating means mounted in said housing and operatively connected to said rollers for causing said rollers to tilt between said race members to change the output/input speed ratio therebetween a required to maintain a substantially constant output speed in response to the action of centrifugal force on said rotating fluid.

2. An engine accessory drive mechanism comprising a housing, a source of fluid therein, an input means, an output means, an input race member having a toroidal surface formed thereon and mounted for rotation with said input means, an output race member having a toroidal surface formed thereon oppositely disposed from said first-mentioned toroidal surface and operatively connected to said output means, a plurality of rollers frictionally engaging said oppositely disposed toroidal surfaces, drive means formed on said output means for driving engine accessories, ratio control actuating means mounted in said housing operatively connected to said rollers for causing said rollers to tilt between said race members to effectuate a substantially constant output speed, and fluid speed-sensing means for sensing changes in the centrifugal force of the rotating fluid and directing said fluid reflecting said changes to said ratio control actuating means.

3. An engine accessory drive mechanism comprising a rotatable housing, a source of fluid therein, said fluid rotating with said housing, an input means, an output means adapted to rotate said housing, an input race member having a toroidal surface formed thereon and mounted for rotation with said input means, an output race member having a toroidal surface formed thereon oppositely disposed from said first-mentioned toroidal surface and operatively connected to said output means, a carrier mounted intermediate said input and output race members, a plurality of rollers operatively connected to said carrier and frictionally engaging said oppositely disposed toroidal surfaces, drive means formed on said output means suitable for driving engine accessories, and fluid speed-sensing ratio change actuating means operatively connected to said carrier for pivoting said carrier so as to cause said rollers to incline between said race members, such inclination producing opposing tractive forces at the contacting edges of said rollers with said races causing said rollers to tilt therebetween to change the output/input speed ratio therebetween in response to the action of centrifugal force on said rotating fluid reflecting changes in input speed while maintaining the output speed substantially constant.

4. An engine accessory drive mechanism comprising a housing, a source of fluid therein, an input means, an output means, a pulley operatively connected to said input means, an input race member having a toroidal surface formed thereon and mounted for rotation with said input means in response to rotation of said pulley, an output race member having a toroidal surface formed thereon oppositely disposed from said first-mentioned toroidal surface and operatively connected to said output means, a carrier, a plurality of rollers operatively connected to said carrier and frictionally engaging said oppositely disposed toroidal surfaces, drive means formed on said output means for driving engine accessories, piston-actuated ratio control means mounted in said housing operatively connected to said carrier for moving said carrier to cause said rollers to tilt between said race members to effectuate a substantially constant output speed, pitot tube fluid speed-sensing means for sensing changes in the centrifugal force of the rotating fluid, and passage means for directing said sensed changes to said piston-actuated ratio control means.

5. An engine accessory drive mechanism comprising a housing, a source of fluid therein, an input means, an output means, a pulley operatively connected to said input means, an input race member having a toroidal surface formed thereon and mounted for rotation with said input means in response to rotation of said pulley, an output race member having a toroidal surface formed thereon oppositely disposed from said first-mentioned toroidal surface and operatively connected to said output means, a carrier mounted intermediate said input and output race members, a plurality of rollers operatively connected to said carrier and frictionally engaging said oppositely disposed toroidal surfaces, drive means formed on said output means suitable for driving engine accessories, piston-actuated ratio control means operatively connected to said carrier for pivoting said carrier so as to cause said rollers to incline between said race members, such inclination producing opposing tractive forces at the contacting edges of said rollers with said races causing said rollers to tilt therebetween to change the output/input speed ratio therebetween in response to changes in input speed while maintaining the output speed substantially constant, and a pitot tube for sensing changes in centrifugal force of said fluid reflective of changes in input speed and directing a fluid signal to said piston-actuated ratio control means.

6. An engine accessory drive mechanism comprising a housing, a source of fluid therein, an input means, an output means, a pulley operatively connected to said input means, an input race member having a toroidal surface formed thereon and mounted for rotation with said input means in response to rotation of said pulley, an output race member having a toroidal surface formed thereon oppositely disposed from said first-mentioned toroidal surface and operatively connected to said output means, a carrier mounted intermediate said input and output race members, a plurality of rollers operatively connected to said carrier and frictionally engaging said oppositely disposed toroidal surfaces, drive means formed on said output means suitable for driving engine accessories, ratio change linkage means operatively connected to said carrier for pivoting said carrier so as to cause said rollers to incline between said race members, such inclination producing opposing tractive forces at the contacting edges of said rollers with said races causing said rollers to tilt therebetween to change the output/input speed ratio therebetween while maintaining the output speed substantially constant, spring-biased piston means for pivoting said ratio change linkage means in response to a fluid signal reflective of changes in input speed, and pitot tube means for sensing changes in rotating fluid speed resulting from said changes in input speed and providing said fluid signal to said spring-biased piston means.

7. The engine accessory drive mechanism described in claim 6, and second pitot tube means for supplying lubricant to various contacting surfaces of said accessory drive mechanism.

8. The engine accessory drive mechanism described in claim 6, and a generator wherein a portion of said housing serves as the armature of said generator.

9. The engine accessory drive mechanism described in claim 6, and a power steering pump operatively connected to said output means whereby said pump uses fluid from said source of fluid within said housing.

* * * * *